United States Patent
Lee

(10) Patent No.: US 7,280,493 B2
(45) Date of Patent: Oct. 9, 2007

(54) METHOD FOR HARDWARE REDUCTION IN ECHO CANCELLER AND NEAR-END CROSSTALK CANCELLER

(75) Inventor: Claymens Lee, Kaohsiung Hsien (TW)

(73) Assignee: Topic Semiconductor Corp., Hsinchu (TW)

( * ) Notice: Subject to any disclaimer, the term of this patent is extended or adjusted under 35 U.S.C. 154(b) by 830 days.

(21) Appl. No.: 10/064,238

(22) Filed: Jun. 25, 2002

(65) Prior Publication Data

US 2003/0214903 A1 Nov. 20, 2003

(30) Foreign Application Priority Data

May 15, 2002 (TW) ............................... 91110099 A

(51) Int. Cl.
*H04B 3/20* (2006.01)
(52) U.S. Cl. ...................... 370/290; 375/350
(58) Field of Classification Search ................ 370/201, 370/286–292; 379/406.01, 406.06, 416, 379/417; 375/346, 350
See application file for complete search history.

(56) References Cited

U.S. PATENT DOCUMENTS

| | | | | |
|---|---|---|---|---|
| 4,481,385 A | * | 11/1984 | Kalfs | .................. 370/289 |
| 4,956,838 A | * | 9/1990 | Gilloire et al. | .............. 370/291 |
| 6,396,872 B1 | * | 5/2002 | Sugiyama | .................. 375/232 |
| 6,421,377 B1 | * | 7/2002 | Langberg et al. | ........... 375/222 |
| 6,757,385 B1 | * | 6/2004 | Ehrenstråle et al. | ... 379/406.14 |
| 6,853,626 B1 | * | 2/2005 | Farhang-Boroujeny et al. | .......................... 370/286 |

* cited by examiner

*Primary Examiner*—John Pezzlo
(74) *Attorney, Agent, or Firm*—Jianq Chyun IP Office

(57) ABSTRACT

The present invention provides a method for hardware reduction in the echo canceller and the near-end crosstalk canceller. The method applies an N (N is a positive integer) times divide frequency sampling operation onto the input data list of the echo canceller first (and the near-end crosstalk canceller). Then, it applies an N times multiply frequency sampling operation onto the output data list of the echo canceller (and the near-end crosstalk canceller) to generate a multiplied frequency data list. Afterwards, a low pass filter operation is applied to the multiplied frequency data list to generate a low pass data list to eliminate the echo signal (and the near-end crosstalk signal). The present invention reduces the number of the taps in the echo canceller and the near-end crosstalk canceller by using the digital signal process technique. Therefore, the area of the whole communication IC occupied by the echo canceller and the near-end crosstalk canceller can be reduced.

12 Claims, 5 Drawing Sheets

METHOD FOR HARDWARE REDUCTION IN ECHO CANCELLER AND NEAR-END CROSSTALK CANCELLER

CROSS REFERENCE TO RELATED APPLICATIONS

This application claims the priority benefit of Taiwan application serial No. 91110099, filed May 15, 2002.

BACKGROUND OF INVENTION

1. Field of Invention

The present invention generally relates to a method for eliminating the far-end echo signal and the near-end crosstalk signal by using the echo canceller and the near-end crosstalk canceller, and more particularly, to a method for hardware reduction in the echo canceller and the near-end crosstalk canceller to achieve the objective of eliminating the far-end echo signal and the near-end crosstalk signal.

2. Description of Related Art

The transceiver is generally used in the communication system for signal transmission. The transceiver is composed of the transmitter (TX) and the receiver (RX). FIG. 1 schematically shows a full duplex transceiver with a hybrid circuit. The full duplex transceiver comprises a near-end transceiver 102 and a far-end transceiver 104. The full duplex transceiver means the send and receive operations can be operated simultaneously. The near-end transceiver 102 comprises a sender 106 and a receiver 108, and the far-end transceiver 104 comprises a sender 110 and a receiver 112. A cable 114 is connected between the near-end transceiver 102 and the far-end transceiver 104. Moreover, the near-end transceiver 102 couples to a hybrid circuit 116, the far-end transceiver 104 couples to a hybrid circuit 118. The near-end transceiver 102 and the hybrid circuit 116 are integrated into a chip, wherein the chip is generally called a communication integrated circuit (IC) used for digital signal process (DSP). Similarly, the far-end transceiver 104 and the hybrid circuit 118 are also integrated into a chip. How the full duplex transceiver transmits the signal is described in detail hereinafter.

Generally speaking, the sender 106 in the near-end transceiver 102 sends the signal to the receiver 112 in the far-end transceiver 104 via the cable 114. Similarly, the sender 110 in the far-end transceiver 104 also sends the signal back to the receiver 108 in the near-end transceiver 102. However, when the sender 106 in the near-end transceiver 102 sends the signal to the far-end transceiver 104, if the impedance of the cable 114 does not match with the impedance of the far-end transceiver 104, a far-end echo signal 120 is generated. The far-end echo signal 120 is subsequently sent back to the receiver 108 in the near-end transceiver 102, and the receiver 108 treats the far-end echo signal 120 as an interfered noise. In order to eliminate the far-end echo signal 120, an echo canceller (EC) is used. FIG. 2 schematically shows a conventional EC. The EC generally adopts an adjustable finite impulse response (FIR) filter. In FIG. 2, $(X_0, X_1, X_2, X_3, \ldots, X_N)$ is an input data list, the blocks (202, 204, 206, 208 to 210) are the delay circuits to delay the input data list, $C_1, C_2, C_3, C_4$ to $C_N$ are the factors, and $(Z_0, Z_1, Z_2, Z_3, \ldots, Z_N)$ is an output data list of the EC, where the output data list is used to eliminate the far-end echo signal. Since the transmission distance of the far-end echo signal 120 is about two times of the length of the cable 114, in order to eliminate the far-end echo signal 120 that is transmitted over such a long distance, the conventional EC has a huge number of the taps.

Furthermore, if the signal sent from the sender 106 in the near-end transceiver 102 is sent by using more than one wire, the crosstalk effect needs to be considered. In the crosstalk effect, the near-end crosstalk (NEXT) is considered as the most serious one. As shown in FIG. 1, the near-end crosstalk signal 122 generated from the crosstalk effect can be eliminated by using the near-end crosstalk canceller (NC), and the structure of the conventional NC is the same as the one shown in FIG. 2. Therefore, the conventional NC also has a huge number of the taps.

In summary, the conventional EC and NC occupy a big portion of the silicon area due to the huge number of the taps they have, so it makes the chip size very big.

SUMMARY OF INVENTION

Therefore, the present invention provides a method for hardware reduction in the echo canceller and the near-end crosstalk canceller. The present invention reduces the number of the taps in the echo canceller and the near-end crosstalk canceller by using the digital signal process technique, so as to reduce the area of the whole communication IC where the area is occupied by the echo canceller and the near-end crosstalk canceller.

In order to achieve the objectives mentioned above and others, the present invention provides a method for reducing the number of hardware in the echo canceller. The method applies an N (N is a positive integer) times divide frequency sampling operation onto the input data list of the echo canceller first. Then, it applies an N times multiply frequency sampling operation onto the output data list of the echo canceller to generate a multiplied frequency data list. Afterwards, a low pass filter operation is applied to the multiplied frequency data list to generate a low pass data list.

In an embodiment of the present invention, the sampling frequency of the N times divide frequency sampling operation is adjustable, and the sampling frequency of the N times multiply frequency sampling operation is also adjustable.

In an embodiment of the present invention, the low pass data list is used to eliminate the far-end echo signal.

In an embodiment of the present invention, the step of applying a low pass filter operation onto the multiplied frequency data list to generate the low pass data list is achieved by using a low pass filter. Moreover, the cutoff frequency of the low pass filter is $1/(2N)$ times of the sampling frequency of the input data list.

In an embodiment of the present invention, the method is used for the receiver in the transceiver.

In an embodiment of the present invention, the echo canceller adopts a finite impulse response (FIR) filter.

The present invention provides a method for hardware reduction in the near-end crosstalk canceller. The method applies an N (N is a positive integer) times divide frequency sampling operation onto the input data list of the near-end crosstalk canceller first. Then, it applies an N times multiply frequency sampling operation onto the output data list of the near-end crosstalk canceller to generate a multiplied frequency data list. Afterwards, a low pass filter operation is applied to the multiplied frequency data list to generate a low pass data list.

In another embodiment of the present invention, the sampling frequency of the N times divide frequency sampling operation is adjustable, and the sampling frequency of the N times multiply frequency sampling operation is also adjustable.

In another embodiment of the present invention, the low pass data list is used to eliminate the near-end crosstalk signal.

In another embodiment of the present invention, the step of applying a low pass filter operation onto the multiplied frequency data list to generate the low pass data list is achieved by using a low pass filter. Moreover, the cutoff frequency of the low pass filter is 1/(2N) times of the sampling frequency of the input data list.

In another embodiment of the present invention, the method is used for the receiver in the transceiver.

In another embodiment of the present invention, the near-end crosstalk canceller adopts a finite impulse response (FIR) filter.

In summary, the method for hardware reduction in the echo canceller and the near-end crosstalk canceller provided by the present invention reduces the number of the taps in the echo canceller and the near-end crosstalk canceller by using the digital signal process technique. Therefore, the area of the whole communication IC occupied by the echo canceller and the near-end crosstalk canceller can be reduced.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a full duplex transceiver with a hybrid circuit.

DETAILED DESCRIPTION

For the sake of simplification, the preferred embodiment of the present invention is described in detail by using the echo canceller on which the method of hardware reduction in the echo canceller applies. However, the same theory can also be applied to the near-end crosstalk canceller on which the method of hardware reduction in the near-end crosstalk canceller (NC) according to the present invention applies.

Figure 1:
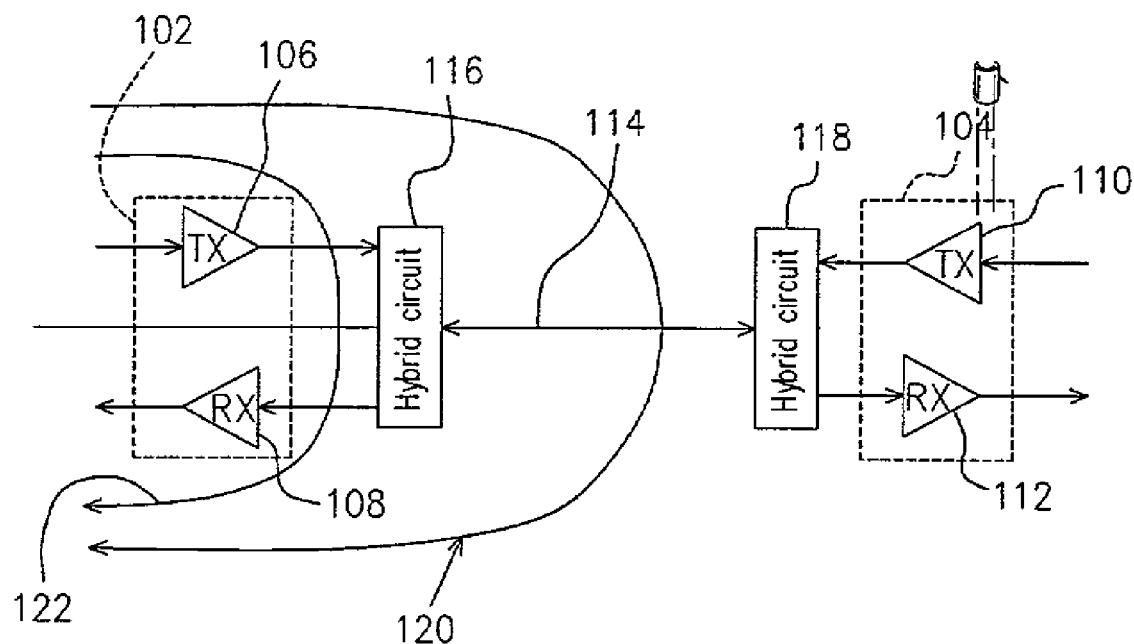
Figure 3:
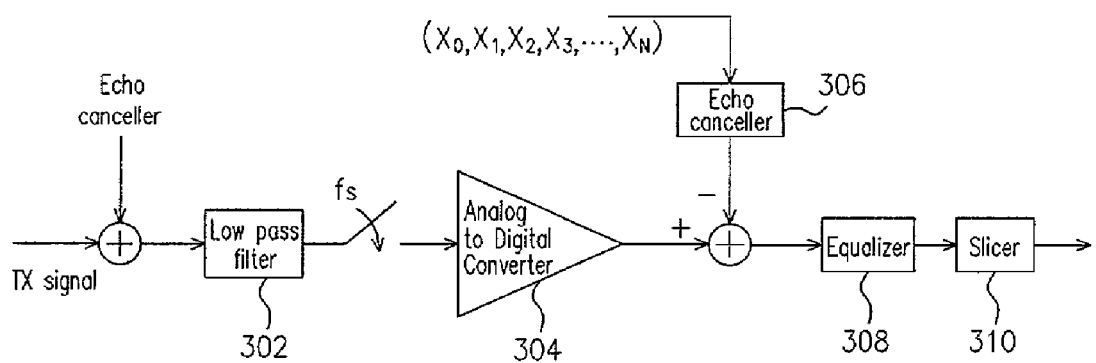
FIG. 3 schematically shows a block diagram of the receiver 108 in FIG. 1.

FIG. 3 schematically shows a block diagram of the receiver 108 in FIG. 1. The receiver 108 comprises a low pass filter (LPF) 302, an analog to digital converter (ADC) 304, an EC (306), an equalizer 308, and a slicer 310. It is assumed that the frequency of the TX signal sent by the sender 106 in FIG. 1 is fs. According to the sampling theory, the low pass filter 302 in the receiver 108 having a cutoff frequency of fs/2 filters the portion of the frequency of the received signal whose frequency is greater than fs/2 to avoid the aliasing effect. This is why the filter is also known as anti-aliasing filter. Therefore, the echo signal also has a bandwidth of fs/2. The EC 306 is used to eliminate the echo signal, and the echo signal is totally eliminated when the operating frequency of the EC 306 is fs.

However, the cutoff frequency of the low pass filter 302 can be reduced by N times (N is a positive integer and is adjustable). In a preferred embodiment of the present invention, the cutoff frequency of the low pass filter 302 is reduced by two times (i.e. the cutoff frequency is fs/4), and thus the jitter of the clock can be reduced. The bandwidth of the received echo signal is also reduced to fs/4 by reducing the cutoff frequency of the low pass filter 302 to fs/4. Under such a circumstance, the operating frequency of the EC 306 does not have to be fs, instead, it is acceptable as long as the operating frequency of the EC 306 is fs/2.

Figure 2:
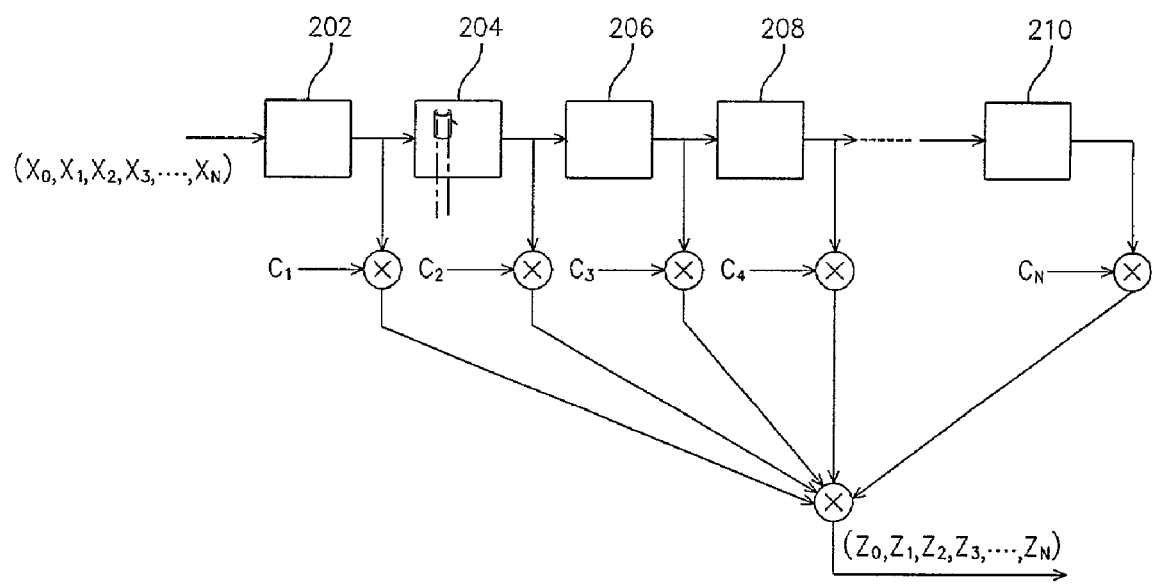
FIG. 2 schematically shows a structure diagram of a conventional echo canceller.
Figure 4:
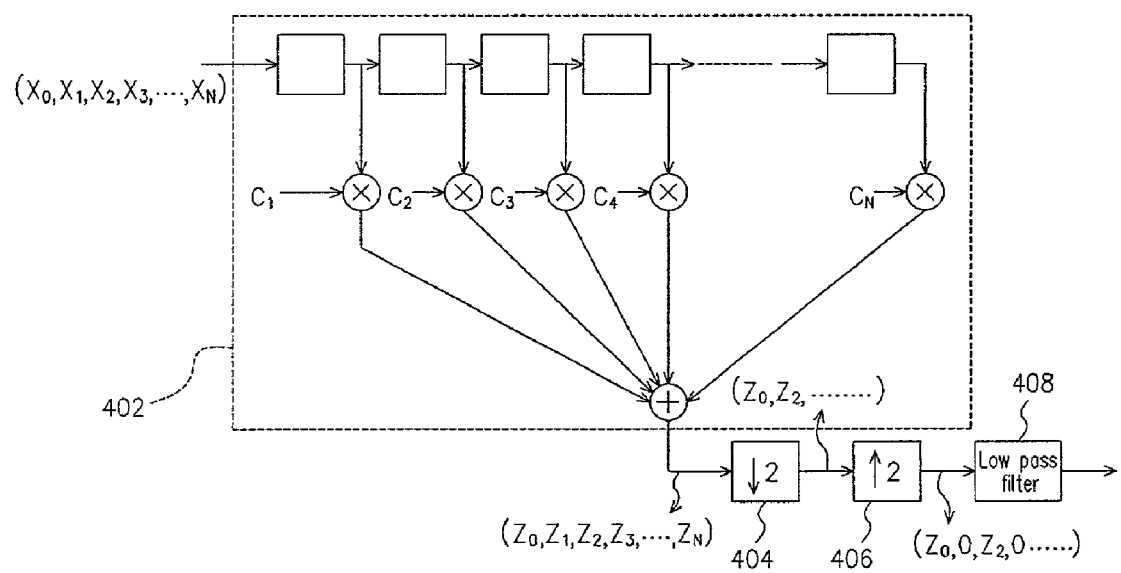
FIG. 4 schematically shows a block diagram of an EC whose operating frequency is reduced to fs/2.

FIG. 4 schematically shows a block diagram of an EC whose operating frequency is reduced to fs/2. The block diagram comprises an EC 402, a two times divide frequency device 404, a two times multiply frequency device 406, and a low pass filter 408. The EC 402 is the same as the conventional EC in FIG. 2. The cutoff frequency of the low pass filter 408 is fs/4. The method of reducing the operating frequency of the EC to fs/2 is as follows. At first, the two times divide frequency device 404 applies a two times divide frequency sampling operation (also known as decimation) onto the output data list $(Z_0, Z_1, Z_2, Z_3, \ldots, Z_N)$ of the EC 402 to generate the divided frequency data list $(Z_0, Z_2, \ldots)$. Then, the two times multiply frequency device 406 applies a two times multiply frequency sampling operation (also known as interpolation) onto the divided frequency data list $(Z_0, Z_2, \ldots)$ to generate the multiplied frequency data list $(Z_0, 0, Z_2, 0, \ldots)$. Afterwards, the low pass filter 408 applies a low pass filter operation onto the multiplied frequency data list $(Z_0, 0, Z_2, 0, \ldots)$ to filter the portion of the frequency whose frequency is greater than fs/4 to generate the low pass data list to eliminate the echo signal.

Figure 5:
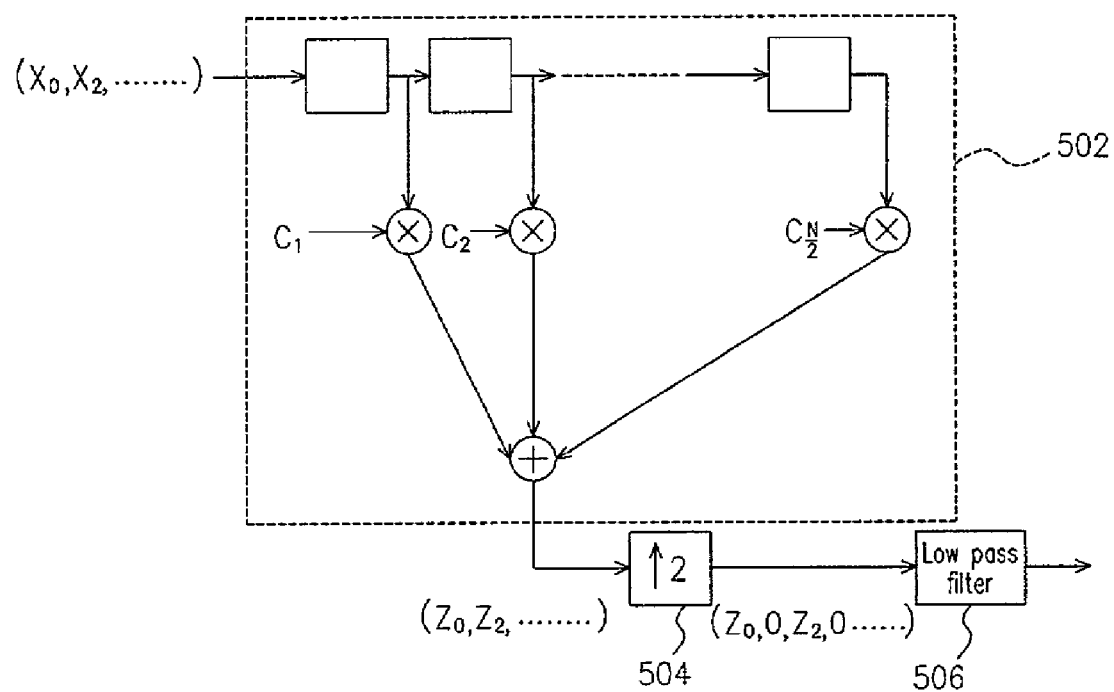
FIG. 5 schematically shows a block diagram of an embodiment that uses a hardware reduction method in the echo canceller according to the present invention.

It is known from FIG. 4 that the operating frequency of the EC 402 can also be reduced to fs/2 by placing the two times divide frequency device 404 in the preceding position of the input data list of the EC 402 as shown in FIG. 5. FIG. 5 schematically shows a block diagram of an embodiment that uses a hardware reduction method in the echo canceller according to the present invention. The block diagram comprises an EC 502, a two times multiply frequency device 504, and a low pass filter 506, wherein the cutoff frequency of the low pass filter 506 is fs/4. The hardware reduction method in the EC according to the present invention is as follows. At first, a two times divide frequency sampling operation is applied onto the input data list $(X_0, X_1, X_2, X_3, \ldots, X_N)$ of the EC 502 to generate the divided frequency input data list $(X_0, X_2, \ldots)$. Then, the two times multiply frequency device 504 applies a two times multiply frequency sampling operation onto the output data list $(Z_0, Z_2, \ldots)$ of the EC 502 to generate the multiplied frequency data list $(Z_0, 0, Z_2, 0, \ldots)$. Afterwards, the low pass filter 506 applies a low pass filter operation onto the multiplied frequency data list $(Z_0, 0, Z_2, 0, \ldots)$ to filter the portion of the frequency whose frequency is greater than fs/4 to generate the low pass data list to eliminate the echo signal. The sampling frequency of the divided frequency input data list $(X_0, X_2, \ldots)$ is changed to fs/2 (i.e. the sampling period is changed to two times longer). It is known from FIG. 5, the number of the delay circuits is reduced to half of the number of the delay circuits in the conventional EC, and the number of the factors $(C_1, C_2, C_3, C_4$ to $C_{(N/2)})$ is also reduced to as half of the number of the factors $(C_1, C_2, C_3, C_4$ to $C_N)$. Therefore, the number of taps in EC 502 is reduced to half of the number of the taps in the conventional EC. Furthermore, it has to be complemented, although the preferred embodiment of the present invention does not describe the hardware reduction method in the near-end crosstalk canceller, to those who are skilled in the related art, it is known that the number of taps in the NC is also reduced compared to the conventional NC when the method of hardware reduction in the near-end crosstalk canceller according to the present invention is applied to it.

In summary, the method for hardware reduction in the echo canceller and the near-end crosstalk canceller provided by the present invention reduces the number of the taps in the echo canceller and the near-end crosstalk canceller by using the digital signal process technique. Therefore, the area of the whole communication IC occupied by the echo canceller and the near-end crosstalk canceller can be reduced.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A method for hardware reduction in an echo canceller, comprising:

applying an N (N is a positive integer) times divide frequency sampling operation onto an input data list of the echo canceller, and the frequency-divided input data list is then transmitted to the echo canceller for performing an echo signal cancellation operation on the frequency-divided input data list;

applying an N times multiply frequency sampling operation onto an output data list of the echo canceller to generate a multiplied frequency data list; and applying a low pass filter operation with a low pass filter onto the multiplied frequency data list to generate a low pass data list, wherein a cutoff frequency of the low pass filter is 1/(2N) times of the sampling frequency of the input data list.

2. The method of claim 1, wherein a sampling frequency of the N times divide frequency sampling operation is adjustable.

3. The method of claim 1, wherein a sampling frequency of the N times multiply frequency sampling operation is adjustable.

4. The method of claim 1, wherein the low pass data list is used to eliminate a far-end echo signal.

5. The method of claim 1, wherein the method is used in a receiver inside a transceiver.

6. The method of claim 1, wherein the echo canceller adopts a finite impulse response filter.

7. A method for hardware reduction in a near-end crosstalk canceller, comprising:

applying an N (N is a positive integer) times divide frequency sampling operation onto an input data list of the near-end crosstalk canceller;

applying an N times multiply frequency sampling operation onto an output data list of the near-end crosstalk canceller to generate a multiplied frequency data list; and applying a low pass filter operation with a low pass filter onto the multiplied frequency data list to generate a low pass data list, wherein a cutoff frequency of the low pass filter is 1/(2N) times of the sampling frequency of the input data list.

8. The method of claim 7, wherein a sampling frequency of the N times divide frequency sampling operation is adjustable.

9. The method of claim 7, wherein a sampling frequency of the N times multiply frequency sampling operation is adjustable.

10. The method of claim 7, wherein the low pass data list is used to eliminate a near-end crosstalk signal.

11. The method of claim 7, wherein the method is used in a receiver inside a transceiver.

12. The method of claim 7, wherein the near-end crosstalk canceller adopts a finite impulse response filter.

* * * * *